(12) United States Patent
Soryal

(10) Patent No.: US 12,294,440 B2
(45) Date of Patent: May 6, 2025

(54) USING TRANSIENT REFLECTIVE SURFACES TO REFLECT A SIGNAL FROM ACCESS POINT EQUIPMENT TO SIGNAL RECEIVING EQUIPMENT

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 417 days.

(21) Appl. No.: 17/809,436

(22) Filed: Jun. 28, 2022

(65) Prior Publication Data

US 2023/0421239 A1    Dec. 28, 2023

(51) Int. Cl.
| | |
|---|---|
| H04B 7/01 | (2006.01) |
| H04B 7/145 | (2006.01) |
| H04W 4/02 | (2018.01) |
| H04W 4/44 | (2018.01) |

(52) U.S. Cl.
CPC ............ *H04B 7/145* (2013.01); *H04W 4/025* (2013.01); *H04W 4/44* (2018.02)

(58) Field of Classification Search
CPC ...... H04B 7/145; H04B 7/02; H04B 7/04013; H04W 4/44; H04W 4/02; H04W 4/025; H04W 12/102
See application file for complete search history.

(56) References Cited

U.S. PATENT DOCUMENTS

| | | | |
|---|---|---|---|
| 11,463,980 B2 * | 10/2022 | Shi ....................... | H04B 7/0695 |
| 11,644,537 B2 * | 5/2023 | Millischer ............. | G01S 7/4814 |
| | | | 356/4.01 |
| 2023/0180347 A1 * | 6/2023 | Gurelli ................. | H04B 17/318 |

* cited by examiner

*Primary Examiner* — Tuan Pham
(74) *Attorney, Agent, or Firm* — GUNTIN & GUST, PLC; Miyoung Shin

(57) ABSTRACT

The technologies described herein are generally directed to detecting reflective surfaces for use reflecting a signal from access point equipment to destination equipment in advanced networks, e.g., at least a fifth generation (5G) network. For example, a method described herein can include receiving a request, from access point equipment, to establish a communications session between the access point equipment and destination equipment. The method can further include based on a source of surface information, predicting that a transient reflective surface is going to be located at a first geographic location and is going to be usable by the access point equipment to reflect a signal to the destination equipment, resulting in reflected path information corresponding to a reflected path for the communications session. Further, the method can include, in response to the request, communicating to the access point equipment, the reflected path information.

20 Claims, 13 Drawing Sheets

USING TRANSIENT REFLECTIVE SURFACES TO REFLECT A SIGNAL FROM ACCESS POINT EQUIPMENT TO SIGNAL RECEIVING EQUIPMENT

TECHNICAL FIELD

The subject application is related to different approaches to handling communication in networked computer systems and, for example, to using reflective surfaces to improve signal propagation.

BACKGROUND

As demands for fast, high-quality wide area network connections have increased, wireless providers have implemented many new technologies, each having advantages and drawbacks over traditional approaches. New, shorter wavelength frequency bands can provide dramatically faster broadband connections to mobile devices, but because these bands can be blocked easier and have narrower beams, positioning them to offer service to user devices in a variety of different locations has been challenging.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
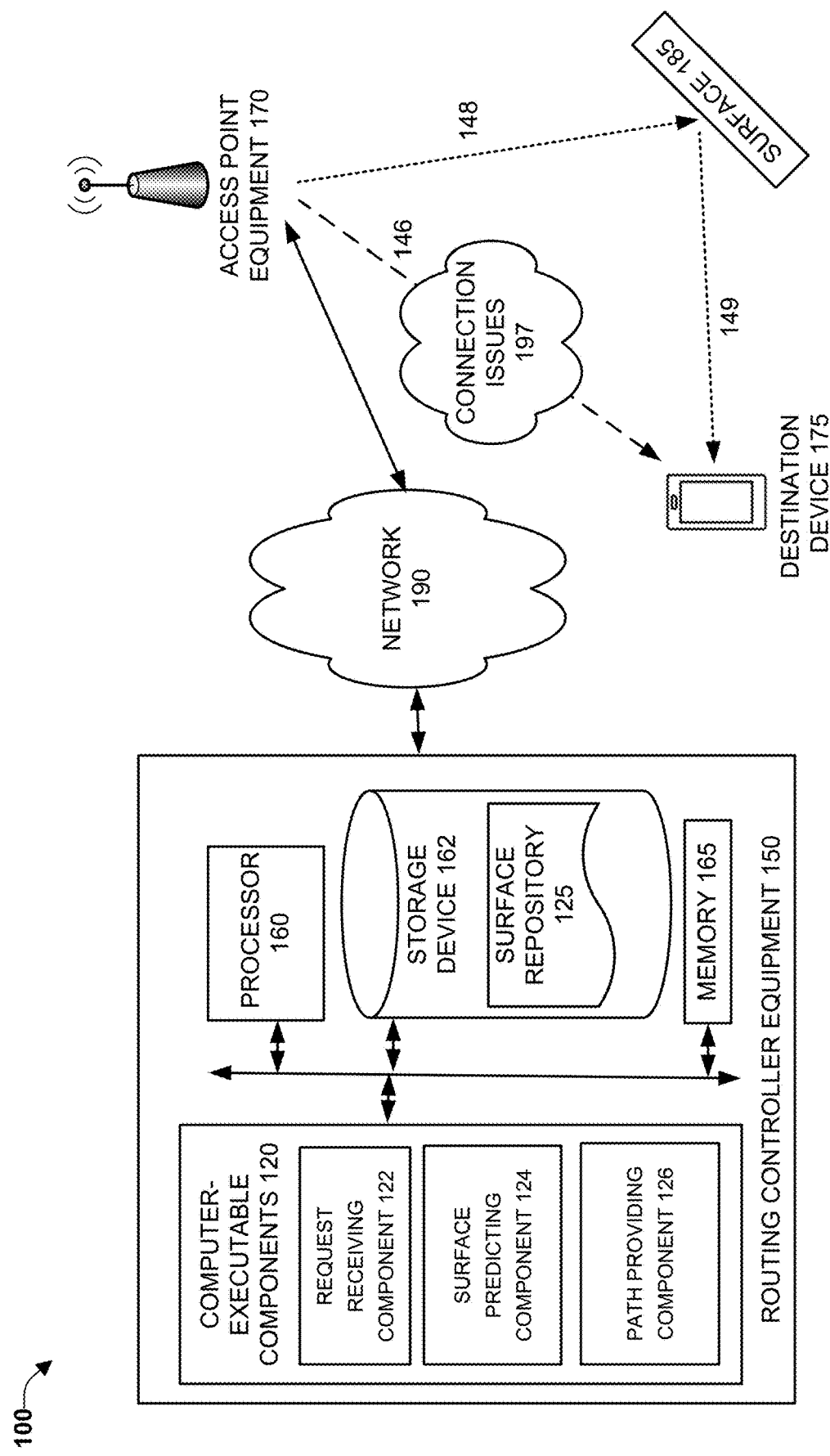
FIG. 1 is an architecture diagram of an example system that can facilitate detecting reflective surfaces for use reflecting a signal from access point equipment to destination equipment, in accordance with one or more embodiments.

Generally speaking, one or more embodiments of a system described herein can facilitate predicting that a transient reflective surface is going to be usable by access point equipment to reflect a signal to destination equipment. In addition, one or more embodiments described herein can be directed towards a multi-connectivity framework that supports the operation of new radio (NR, sometimes referred to as 5G). As will be understood, one or more embodiments can improve network connectivity, by supporting control and mobility functionality on cellular links (e.g., long term evolution (LTE) or NR). One or more embodiments can provide benefits including, system robustness, reduced overhead, and global resource management.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz long term evolution (LTE) bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments, understandable variations of the non-limiting terms "signal propagation source equipment" or simply "propagation equipment," "radio network node" or simply "network node," "radio network device," "network device," and access elements are used herein. These terms may be used interchangeably and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNode B (gNB), eNode B (eNB), network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, understandable variations of the non-limiting term user equipment (UE) are used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 10 and 11 below. Some embodiments are described in particular for 5G new radio (NR) systems. The embodiments are however applicable to any radio access technology (RAT) or multi-RAT system where the UEs operate using multiple carriers, e.g., LTE. Some embodiments are described in particular for 5G new radio systems. The embodiments are however applicable to any RAT or multi-RAT system where the UEs operate using multiple carriers, e.g., LTE.

One having skill in the relevant art(s), given the disclosure herein, understands that the computer processing systems, computer-implemented methods, equipment (apparatus) and/or computer program products described herein employ hardware and/or software to solve problems that are highly technical in nature (e.g., rapidly and dynamically utilizing mapped reflective surfaces to direct communication beams), that are not abstract and cannot be performed as a set of mental acts by a human. For example, a human, or even a plurality of humans, cannot efficiently manage the complex reflected paths (which generally cannot be performed manually by a human) with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate detecting reflective surfaces for use reflecting a signal from access point equipment to destination equipment. Different examples that describe these aspects are included with the description of FIGS. 1-13 below. It should be noted that the subject disclosure may be embodied in many different forms and should not be construed as limited to this example or other examples set forth herein.

FIG. 1 is an architecture diagram of an example system 100 that can facilitate detecting reflective surfaces for use reflecting a signal from access point equipment to destination equipment, in accordance with one or more embodiments. For purposes of brevity, description of like elements and/or processes employed in other embodiments is omitted.

As depicted, system 100 includes routing controller equipment 150 communicatively coupled to access point equipment 170 via network 190. Access point equipment 170 has a direct signal path 146 to destination device 175, and also, in accordance with one or more embodiments, communicate indirect signal 148 to be reflected off of surface 185 to become reflected signal 149 received by destination device 175.

With respect to reflected signal 149 (as well as other reflected signals discussed herein), one having skill in the relevant art(s), given the description herein, understands that, as used to describe one or more embodiment herein, a reflected beam can be along a path according to which the beam is relayed by the surface to the user equipment at a first angle corresponding to a second angle at which the second signal strikes the surface. Further to this, it is noted that example signal paths shown in various drawings herewith are approximations meant to be used to illustrate different concepts described herein, and are not meant to show particular reflection angles, distances, and other path characteristics.

Routing controller equipment 150 can include computer-executable components 120, processor 160, storage device 162 and memory 165. Storage device 162 can include surface repository 125. Computer-executable components 120 can include request receiving component 122, surface predicting component 124, path providing component 126, and other components described or suggested by different embodiments described herein, that can improve the operation of system 100.

Generally speaking, as described herein, access point equipment can be provided useful information regarding surface 185 that can facilitate routing a communications signal via reflection from surface 185 for reasons including routing around connection issues 197. It is appreciated that connection issues 197 can include one or more conditions that affect the transmission of communication beams (e.g., radio waves, light beams, sound waves) along direct signal path 146 from access point equipment to destination device 175.

With respect to all signal receiving equipment described herein, it is appreciated that one or more embodiments can be used to provide replacement or additional signals for different types of communication (e.g., for control signals and/or customer communication signals). One having skill in the relevant art(s), given the description herein, understands how one or more embodiments can beneficially provide additional signal streams to destination devices with multiple input capabilities, e.g., as part of multiple input/multiple output (MIMO) capabilities.

One having skill in the relevant art(s), given the descriptions herein, understands that connection issue 197 conditions can include signals congestion, interference, and blockages. In one or more embodiments, connection issues 197 can also broadly include conditions that can detract from signals being communicated to destination device 175 on a priority basis, e.g., when destination device 175 is designated as being used by first responders, additional communication beams can be used to improve one or more aspects of connections therewith. Further to this point, it should be appreciated that one or more embodiments can use reflected signal 149 as a supplement to otherwise unimpeded direct signal path 146, e.g., providing additional communication signals to destination device 175 as a MIMO device.

Thus, in an example, when quality of a communications session with destination device 175 (e.g., via direct signal path 146) is identified as being below a threshold level of quality (e.g., resulting in a low-quality signal), one or more embodiments can request additional paths based on reflected signals from routing controller equipment 150 to provide alternative or additional (e.g., via MIMO capabilities of destination device 175) signals to improve the quality of the communications session.

With respect to the uplink communication capabilities of destination device 175, based on the disclosure herein, it is appreciated that surface repository 125 and surface 185 can also, in one or more embodiments described herein, be used by destination device 175 to communicate uplink signals to access point equipment 170, e.g., to avoid connection issues 197 or to supplement MIMO communications by utilizing both the reverse of direct signal path 146 and the reverse of reflected signal 149. It should be noted that, to facilitate the use of surface 185 for reflection of signals from destination device 175 to access point equipment 170 can utilize capabilities of destination device 175 to transmit signals in a particular direction, e.g., these capabilities being now known or developed in the future.

Continuing the discussion of routing controller equipment 150, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, routing controller equipment 150 can further comprise various computer and/or computing-based elements described herein with reference to mobile handset 1200 of FIG. 12, and operating environment 1300 of FIG. 13. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1306 and FIG. 13. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

As described further herein, storage device 162 is provided as an example storage component for storage of surface information (e.g., for surface 185) including but not limited to, one or more of, the geographic location of surface 185, the absolute orientation (e.g., heading) of surface 185, the relative location of surface 185 relative to access point equipment 170 and/or destination device 175, the relative orientation of surface 185 to access point equipment 170 and/or destination device 175, characteristics of surface 185 (e.g., reflective capability, times when surface is available, limitations on use of surface 185), and whether surface 185 is moving or stationary. One having skill in the relevant art(s), given the description herein, understands additional characteristics that can be stored in surface repository 125 that can affect how surface 185 can provide the different functions described herein, e.g., directing reflected signal 149 to destination device 175. It is also appreciated that storage device 162 is a non-limiting example location for surface repository 125, with other beneficial locations of part or all of this repository being selected based on implementation specific factors, e.g., storage at access point equipment 170 and/or destination device 175.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1304 of FIG. 13. Such examples of processor 160 can be employed to implement any embodiments of the subject disclosure.

In one or more embodiments, computer-executable components 120 can be used in connection with implementing one or more of the systems, devices, components, and/or computer-implemented operations shown and described in connection with FIG. 1 or other figures disclosed herein. For example, in one or more embodiments, computer-executable components 120 can include instructions that, when executed by processor 160, can facilitate performance of operations defining request receiving component 122. As discussed with FIG. 3 below, request receiving component 122 can, in accordance with one or more embodiments, receive a request from access point equipment to establish a communications session between the access point equipment and a user equipment. For example, one or more embodiments of routing controller equipment 150 can receive a request from access point equipment 170 to establish a communications session between the access point equipment and user equipment, e.g., destination device 175.

Further, in another example, in one or more embodiments, computer-executable components 120 can include instructions that, when executed by processor 160, can facilitate performance of operations defining surface predicting component 124. As further discussed with FIGS. 3-5 below, surface predicting component 124 can, in accordance with one or more embodiments, based on a source of surface information, predict that a transient reflective surface is going to be located at a first geographic location and is going to be usable by the access point equipment to reflect a signal to the destination equipment, resulting in reflected path information corresponding to a reflected path for the communications session.

Figure 3:
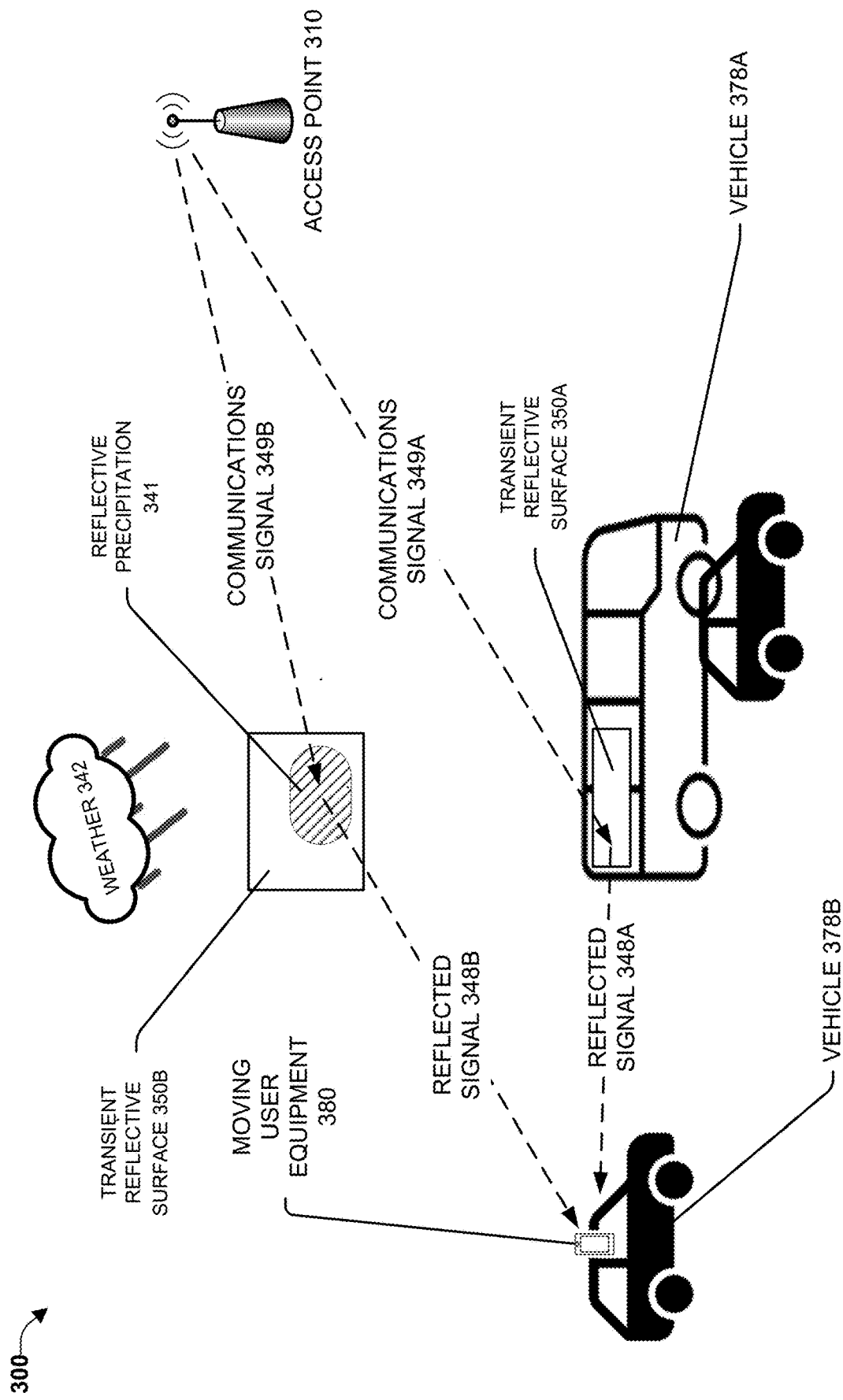
FIG. 3 is a diagram of a non-limiting example system that provides additional details regarding different approaches to utilizing different types of transient reflective surfaces, in accordance with one or more embodiments.

For example, in different implementations, one or more embodiments can predict that reflective surface 185 will be usable to facilitate a connection between destination device 175 and access point equipment 170, resulting in reflected path information corresponding to a reflected path for the communications session, e.g., indirect signal 148 reflected off of surface 185 resulting in reflected signal 149 to destination device 175. FIG. 3 below describes an example surface 185 as a transient reflective surface, e.g., at a particular time, surface 185 can be moving, and can be predicted to be at particular geographic location by one or more embodiments. Additional examples of the transience of some surfaces are also discussed with FIG. 3 below, e.g., some surfaces 185 can be predicted to be reflective to different degrees because of different types of precipitation.

In yet another example, computer-executable components 120 can include instructions that, when executed by processor 160, can facilitate performance of operations defining path providing component 126. As discussed herein, in one or more embodiments, path providing component 126 can in response to the request, communicate to the access point equipment, the reflected path information. For example, one or more embodiments can in response to the request from access point equipment 170, routing controller can receive predictions from surface predicting component 124, provide reflected path information to access point equipment 170 for use communicating with destination device 175.

In an example process whereby surface predicting component 124 can use signal propagation principles to select surface 185 from surface repository 125, one or more embodiments can, based on the request from access point equipment 170, identify respective geographic locations of access point equipment 170 (e.g., based on a location reported by the access point equipment with the request, or from network records of access point locations) and the user equipment (e.g., determined by location determining technology of destination device 175, or estimated by access point equipment 170). One having skill in the relevant art(s), given the description herein, appreciates that signal reflection paths can be estimated based on the signal transmission point (e.g., the location of access point equipment 170), the location and orientation of a reflective surface (e.g., surface 185) at the time of the reflection, and the destination of the signal, e.g., destination device 175.

Additional factors that can affect the propagation of signals described by some embodiments herein include, but are not limited to, the transmission strength of the signal, e.g., varying based on factors including the reflective capability of surface 185 and the distances of the elements the reflected signal path. Other factors include the time for the connection (e.g., some surfaces 185) vary in their availability based on different dates and times, and whether the reflective surface 185 that can facilitate the connection is a moving surface. One having skill in the relevant art(s), given the description herein, appreciates that modern processing power can enable the rapid (e.g., changes made in milliseconds) selection and modification of factors including the surfaces selected for reflection, signals to be aimed, transmission strengths to be selected.

Additional approaches to identifying, selecting, and utilizing transient reflective surfaces that can be used by one or more embodiments are discussed with the descriptions of FIGS. 2-3 below.

Figure 2:
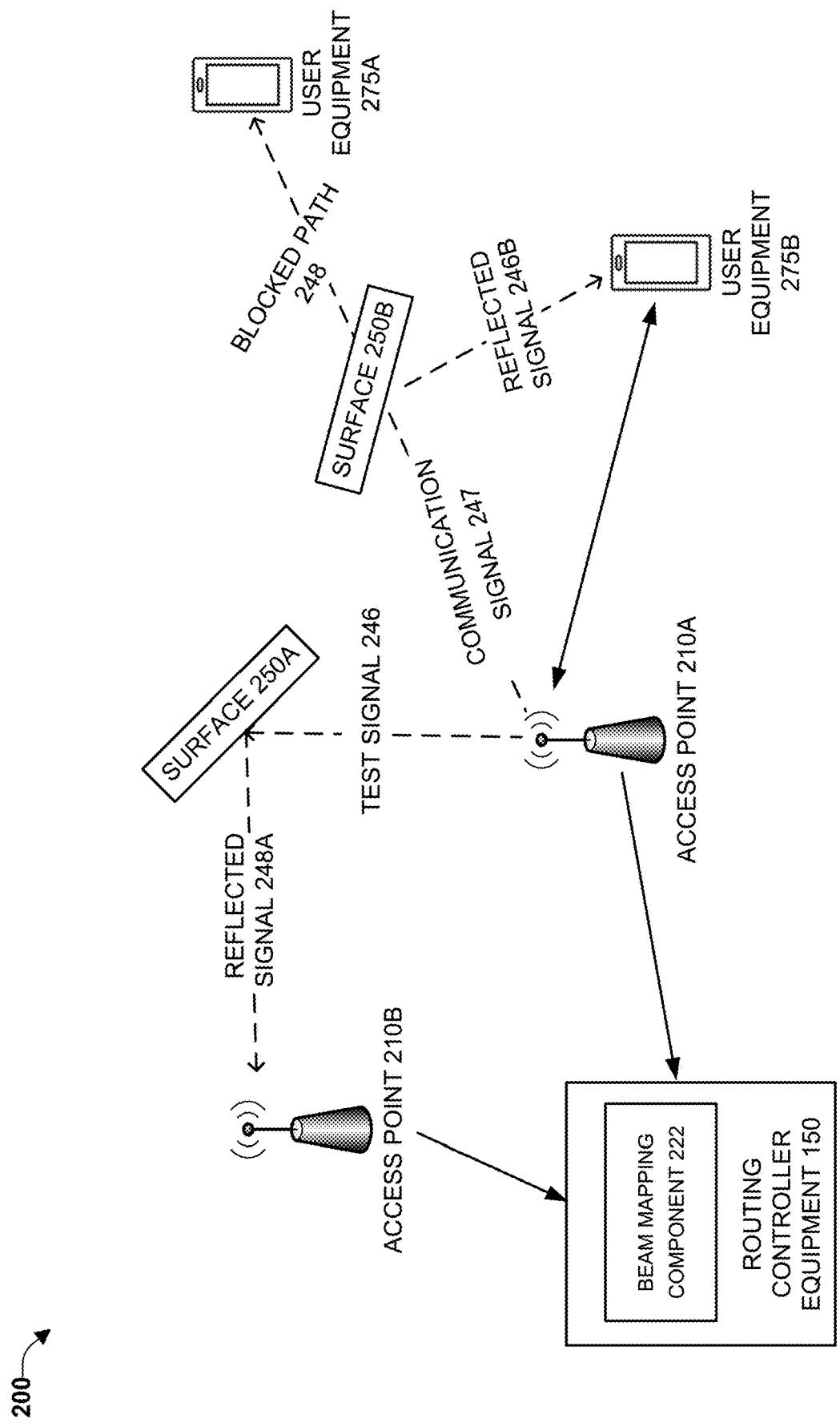
FIG. 2 is a diagram of a non-limiting example system that can facilitate predicting that a transient reflective surface is going to be usable by access point equipment to reflect a signal to destination equipment, in accordance with one or more embodiments.

FIG. 2 is a diagram of a non-limiting example system 200 that can facilitate predicting that a transient reflective surface is going to be usable by access point equipment to reflect a signal to destination equipment, in accordance with one or more embodiments. For purposes of brevity, description of like elements and/or processes employed in other embodiments is omitted.

As depicted, system 200 shows routing controller equipment 150 receiving information from access points 210A-B, with access point 210A communicating test signal 246 and communication signal 247 to surfaces 250A-B, with these surfaces relaying reflective signals 246A-B to access point 210B and user equipment 275B, respectively. As depicted in FIG. 2, communication signal 247 is directed to user equipment 275A, but surface 250B results in blocked path 248. To identify surfaces 250A-B to access point 210A, one or more embodiments can utilize beam mapping component 222 of routing controller equipment 150.

Generally speaking, FIG. 2 depicts, and this section describes, different approaches to generating and updating predictions based on surface repository 125. Even given these approaches to building a frequently updated repository of reflective surface information, it should be noted that one or more embodiments can use different approaches to discover and use reflective surfaces as needed. It is envisioned that any of the preemptive approaches described below (e.g., test signals 246) can be used in response to requirements for supplemental connectivity, e.g., based on interference or other connection issues 197.

In the example depicted in FIG. 2, routing controller equipment is building or updating information in surface repository 125, e.g., locations, movement profiles, reflective orientations, and characteristics of reflective surfaces 250A-B. In a first approach, beam mapping component can request that tasks be performed by access point 210A, e.g., an example task being to transmit one or more test signals 246 in different, known directions. In different embodiments, test signal 246 is generated an aimed at surface 250A (e.g., a building or other potentially reflective structure) to assess different, potentially useful characteristics of the surface.

In this example, test signal 246 reflects off of surface 250A and is received by another access point 210B in the communications network. One having skill in the relevant art(s), given the description herein, appreciates that having the known locations of access points 210A-B and either an estimated location (e.g., by signal strengths of transmitted and received signals) or a known location (e.g., by maps of buildings, etc.) of surface 250A, can facilitate the determination or estimation of different characteristics of surface 250A, e.g., reflective orientation and reflective capacity. This information can be used to update surface repository 125. Alternative implementations of this example can be based on the workload of access point 210A (e.g., with test signal 246 being generated at a time of low utilization).

After the information is collected by access points 210A-B, routing controller equipment 150 can receive the information, e.g., including a unique code and a direction indication of test signal 246. Based on this direction indication and a destination location of the signal (e.g., the geographic location of access point 210B) beam mapping component 222 can map a geographic location of surface 250A and this information can be stored in surface repository 125. In an example, beam mapping component 222 can be implemented as a radio access network intelligent component (RANIC), discussed with FIGS. 6-8 below.

In another example, surface 250B can be detected and analyzed based on a communication signal 247 sent out under a standard communication session by access point 210A. In the example depicted, communication signal can have been directed toward user equipment 275A, but the path of this signal is blocked by surface 250B, e.g., resulting in reflected signal 246B. Similar to the first example discussed above, reflected signal is detected by an element of the communications network, e.g., user equipment 275B. In this example, the received signal strength and other signal quality can be measured. In a variation of this signal measurement, user equipment 275B can utilize a directional antenna to determine the direction from which reflected signal 246B originated.

FIG. 3 is a diagram of a non-limiting example system 300 that provides additional details regarding different approaches to utilizing different types of transient reflective surfaces, in accordance with one or more embodiments. For purposes of brevity, description of like elements and/or processes employed in other embodiments is omitted. FIG. 3 depicts access point 310 communicating with moving user equipment 380 via transient reflective surfaces 350A-B of vehicles 378A-B, respectively.

In the examples depicted, vehicle 378A comprises transient reflective surface 350A (e.g., a reflective surface on the side of a bus), and transient reflective surface 350B is temporarily rendered reflective by weather 342 resulting in reflective precipitation, e.g., rain, snow, hail, sleet, and ice can be reflective. Access point 310 communicates by transmitting communication signals 349A-B respectively towards transient reflective surfaces 350A-B, e.g., based on predictions provided by surface predicting component 124, as discussed above.

As is understood by one having skill in the relevant art(s), given the description herein, beam mapping component 222 can use a variety of different types of information to gather information for predicting the usability of transient reflective surfaces 350A-B for signal reflection. Information sources can include, as discussed with FIG. 2 above, surface information gathered by network components (e.g., access points 210A-B and user equipment 275A-B) over time, e.g., checking locations for the occasional presence of reflective surfaces, e.g., a parking lot, a roadway, train tracks, bodies of water, windows and doors that open and close, etc., can all have moving reflective surfaces that can be detected, tracked, and modeled so as to facilitate predictions.

Additional information that can be used to supplement the collected information include, but are not limited to, maps that include locations that can be determined to potentially have reflective surfaces available (e.g., roads, train tracks, parking lots, buildings, etc.), transportation schedules describing the movement of buses and trains, sports schedules describing when parking lots are predicted to be full.

In addition, one or more embodiments can receive information from the moving surfaces as to their present and future locations, e.g., the bus operator of vehicle 378A can be offered incentives to provide real time tracking information about the movement of vehicles 378B, e.g., location, direction, and velocities on the roadway of both mobile user equipment 380 and vehicle 378A. In addition, the velocities and other movement characteristics of traffic on the roadway generally can be used to predict the locations of the network elements discussed.

It should be noted that, although mobile user equipment 380 and transient reflective surface are depicted as moving (e.g., with vehicles 378A-B), one having skill in the relevant art(s), given the description herein appreciates that any combination of the three network components can be mobile or stationary, e.g., access point 310 can also be mobile and, in some implementations, receiving surface and destination tracking information from both mobile user equipment 380 and vehicle 378A.

Also, while certain normal surfaces of different reflective objects can be naturally reflective (e.g., glass and shiny metal that are exposed on vehicles 378A-B), additional incentives can be offered that can cause specially provided reflective surfaces to be added to vehicles, buildings, and other potentially reflective objects, e.g., reflective paint and other attachable surfaces.

It should be noted that, in additional implementations, approaches similar to those discussed above that can be used to locate moving vehicles for use reflecting signals, can also be used to specifically avoid the use of certain vehicles for reflective purposes. For example, when a schedule, data feed, or other provided data source indicates that an aircraft is predicted to be in a particular space, one or more embodiments can use this information to avoid transmitting signals towards the aircraft. This can be useful for use in areas where reflective surfaces such as building windows are detected and designated for use above the altitude of potential aircraft in the area, e.g., one or more embodiments can distinguish between usable and unusable reflective surfaces.

Another type of transient reflective surface that can be used by one or more embodiments includes surfaces that can temporarily be rendered reflective by reflective precipitation 341, e.g., by rain or other precipitation adhered to the precipitation-holding material. For example, a weather forecast for, or real time weather observation of weather 342 can indicate that reflective precipitation 341 is predicted to change the reflective characteristics of transient reflective surface 350B.

Figure 4:
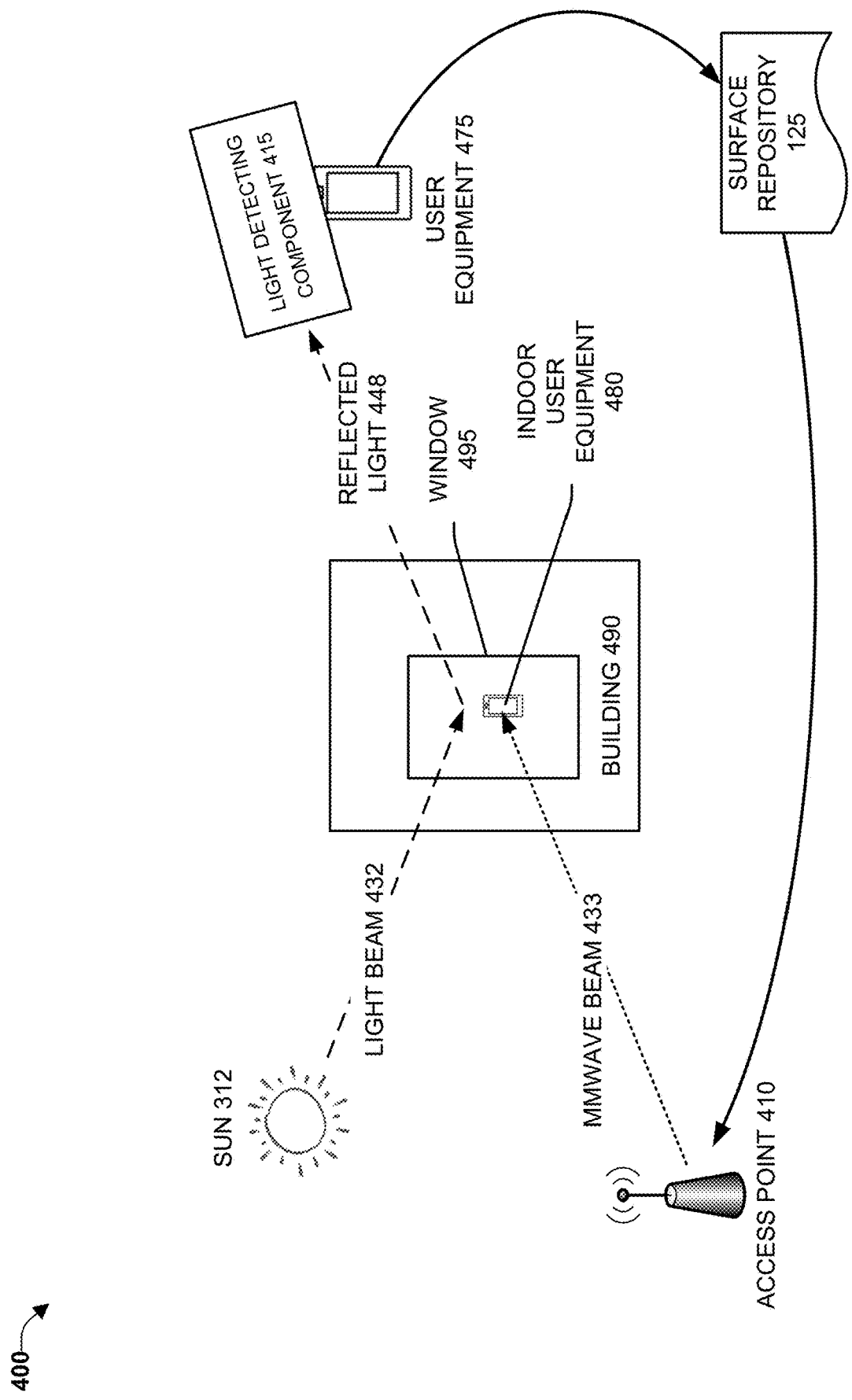
FIG. 4 is a diagram of a non-limiting example system that can facilitate predicting that a transient reflective surface is going to be usable by access point equipment to reflect a signal to destination equipment, in accordance with one or more embodiments.

FIG. 4 is a diagram of a non-limiting example system 400 that can facilitate predicting that a transient reflective surface is going to be usable by access point equipment to reflect a signal to destination equipment, in accordance with one or more embodiments. For purposes of brevity, description of like elements and/or processes employed in other embodiments is omitted. FIG. 4 depicts indoor user equipment 480 inside building 490 with window 495. As depicted in FIG. 4, light beam 432 of sun 12 can be detected by light detecting component 415 of user equipment 475 as reflected light 448 off of window 495. User equipment 475 can gather information described below about window 495, and store the information in surface repository 125 for use by access point 410.

In this example, window 495 represents a reflective surface that can temporarily allow access by communication signals (e.g., mmWave 433) to potentially hard to reach areas (e.g., building 490) for communication with destination devices (e.g., indoor user equipment 480). As such, example window 495 is a window can cause reflectivity in a space that can occasionally not be reflective, e.g., window 495 can be open and thus the space it covers is not reflective at that time. One having skill in the relevant art(s), given the description herein, appreciates that other potentially hard for signals to reach areas can have similar conditions, e.g., a bus shelter can be temporarily obscured by a movable reflective surface (e.g., a bus), and a train door can temporarily reflect or allow passage of similar signals.

As noted with FIG. 2 above, one or more embodiments can use signal/beam generating devices to detect reflective surfaces, with information about the characteristics of these surfaces being stored in surface repository 125 for use with different functions, e.g., reflecting communication signals to reach destination devices by alternative paths. In the example illustrated with system 400, the reflective surface (e.g., closed window 495) can be detected, e.g., by light detecting component 415 of user equipment 475, stored in surface repository 125, and provided to access point 410 for use reflecting a signal to a destination device, e.g., as shown in FIG. 1.

As discussed with FIGS. 2-3 above, surface repository 125 can be a reference that is updated based on changing conditions, e.g., some locations that are detected as reflective can at different times be non-reflective, e.g., a moving car on a road, or a metal trash can placed at a curb. One or more embodiments, by testing different locations over time, can systematically determine conditions where a reflective surface is available for reflections, e.g., during a time of heavier road traffic a vehicle will likely be at a location or on a day where trash is collected the reflective trash can may be placed in a particular area.

With the example of FIG. 4, one or more embodiments can detect times of non-reflectivity and, over time, determine that this non-reflectivity can be indicative of signal access to areas that are not otherwise accessible, or access by supplementary signals based on a different path than other signals, e.g., indirect signal 148 of FIG. 1. In the FIG. 4 example, window 495 has been detected as occasionally allowing access to the inside of building 490 to indoor user equipment 480. Thus, when indoor user equipment 480 initiates a communication session (e.g., based on communication signals that can access building 490), one or more embodiments can direct a communication signal (e.g., mmWave 433) at window 495 for a chance at a beneficial high-bandwidth connection to indoor user equipment 480.

Returning to the example of FIG. 4, computer-executable components 120 can further include instructions that, when executed by processor 160, can cause beam mapping component 222 to determine that window 495 of building 490 is open to expose an opening into the structure, and based on the opening and an indication that indoor user equipment 480 is inside the structure, surface predicting component 124 can provide access point 410 a route through window 495 for mmWave 433 to access the user device.

Figure 5:
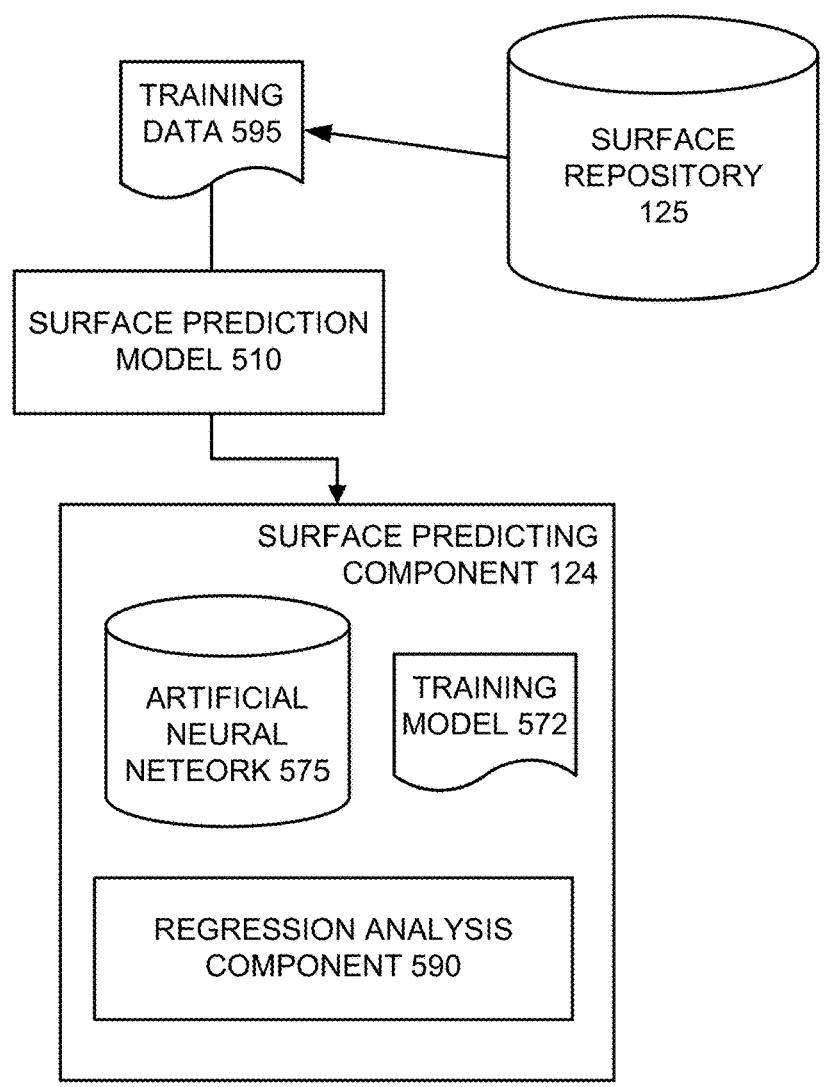
FIG. 5 illustrates an implementation of an example, non-limiting system that can utilize machine learning predictive models to predict the availability of dynamic and transient reflective surfaces, by employing artificial intelligence and machine learning in combination or individually, by approaches including but not limited to, those described below, in accordance with one or more embodiments.

FIG. 5 illustrates an implementation of an example, non-limiting system 500 that can utilize machine learning predictive models to predict the availability of dynamic and transient reflective surfaces, by employing artificial intelligence and machine learning in combination or individually, by approaches including but not limited to, those described below, in accordance with one or more embodiments. For purposes of brevity, description of like elements and/or processes employed in other embodiments is omitted.

As depicted, system 500 can comprise surface predicting component 124, surface repository 125, training data 595, and surface prediction model 510. Surface predicting component 124, in this example, can comprise artificial neural network (ANN) 575, ANN training model 572, and regression analysis component 590.

In certain embodiments, different functions of surface predicting component 124 can be facilitated based on classifications, correlations, inferences and/or expressions associated with principles of artificial intelligence and machine learning. For example, surface predicting component 124 can employ expert systems, fuzzy logic, SVMs, Hidden Markov Models (HMMs), greedy search algorithms, rule-based systems, Bayesian models (e.g., Bayesian networks), ANNs, other non-linear training techniques, data fusion, utility-based analytical systems, systems employing Bayesian models, and ensemble ML algorithms/methods, comprising deep neural networks (DNN), reinforcement learning (RL), Bayesian Statistics, long short-term memory (LSTM) networks. One or more of the above approaches can be specified in capacity prediction model 510 can be used by surface predicting component 124 to analyze one or more sources of network usage information discussed above. In an approach that can be used by some embodiments described herein, the impact of different parameters on the overall working of the slice can be modeled, and specific conditions can be identified under which the slice performance can slow down or users can experience performance degradation.

In an example embodiment, surface repository 125 can be used with training model 572 to train (also termed 'optimize') ANN 575, e.g., by historical information collected by routing controller equipment 150. In additional embodiments, initial and subsequent training of ANN 575 can be based on collected production data stored in surface repository 125 that has been divided into training data 595 in a first data portion and optimizing data (e.g., testing and validation data) in a second portion of data. In different approaches, these portions can be selected based on different approaches that comprise, but are not limited to, a random or pseudo-random selection process.

As would be appreciated by one having skill in the relevant art(s), given the description herein, different aspects of network data records can be used to train ANN 575. Example values that can be assessed comprise, bandwidth utilization, quality of service metrics such as key performance indicators (KPIs) and key quality indicators (KQI), performance and configuration data collected by UE/eNodeB, along with different scenarios of traffic utilization e.g., peak utilization, minimal utilization, and average utilization of network interfaces. As would be appreciated by one having skill in the relevant art(s), given the description herein, after training by the first portion of data, the second portion of data, analysis results for the data, can be used to validate and update ANN 575, if needed. It should be noted that this description of employing an ANN is non-limiting, e.g., one or more embodiments can use other types of artificial intelligence and machine learning algorithms that receive input and perform capacity analysis as described above.

In another approach, machine learning (supervised learning) based solutions to analyze the types of data described above to generate predicted need for capacity assigning modifications for network slices. As would be appreciated by one having skill in the relevant art(s), given the description herein, regression analysis component 590 can be used to apply a regression analysis approach to machine learning for embodiments, e.g., this approach being useful in some circumstances for analyzing data to generate different optimal solutions to a problem.

Figure 6:
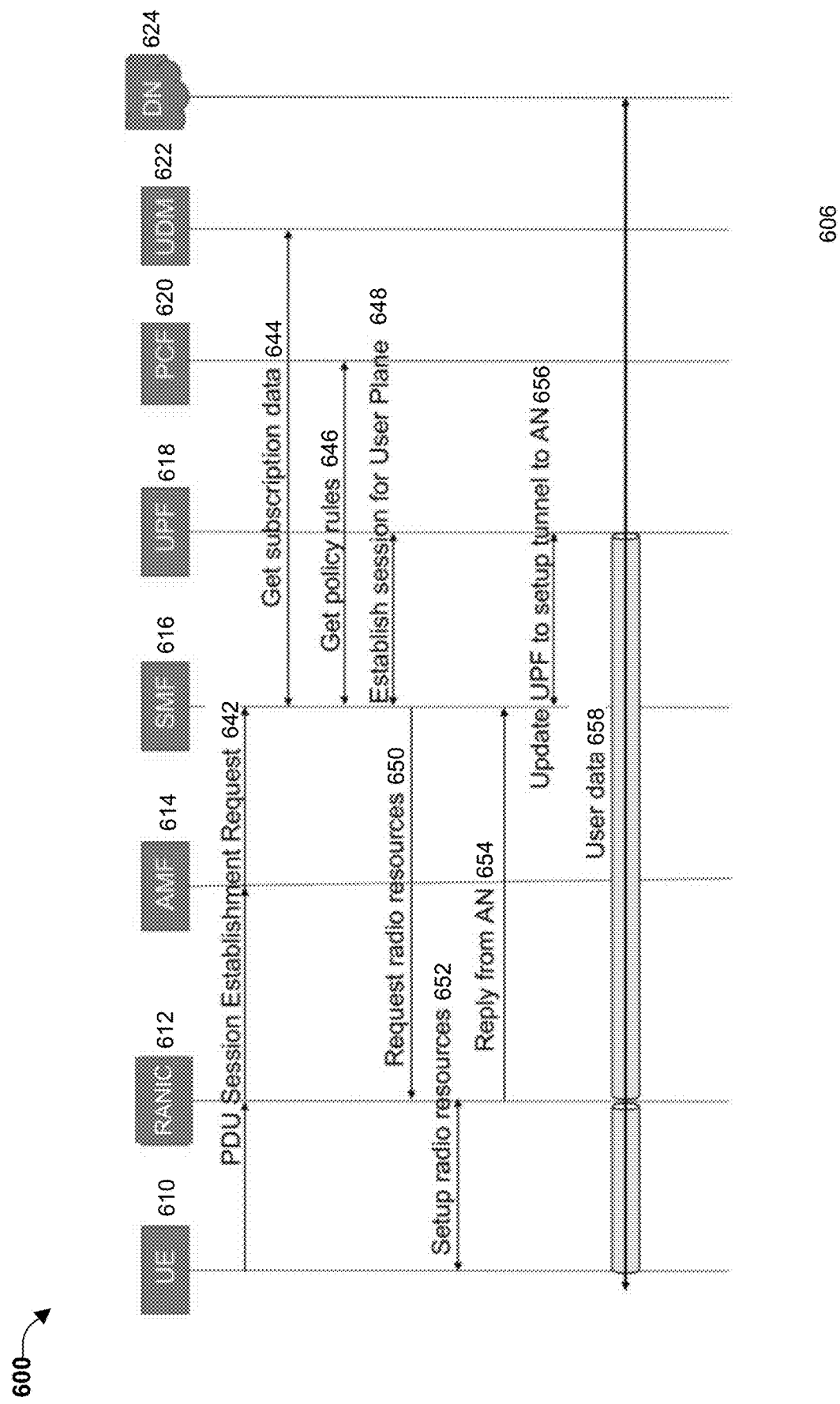
FIG. 6 depicts a non-limiting example architecture diagram of an example system that can facilitate using transient reflective surfaces reflect a signal to destination equipment, in accordance with one or more embodiments.
Figure 7:
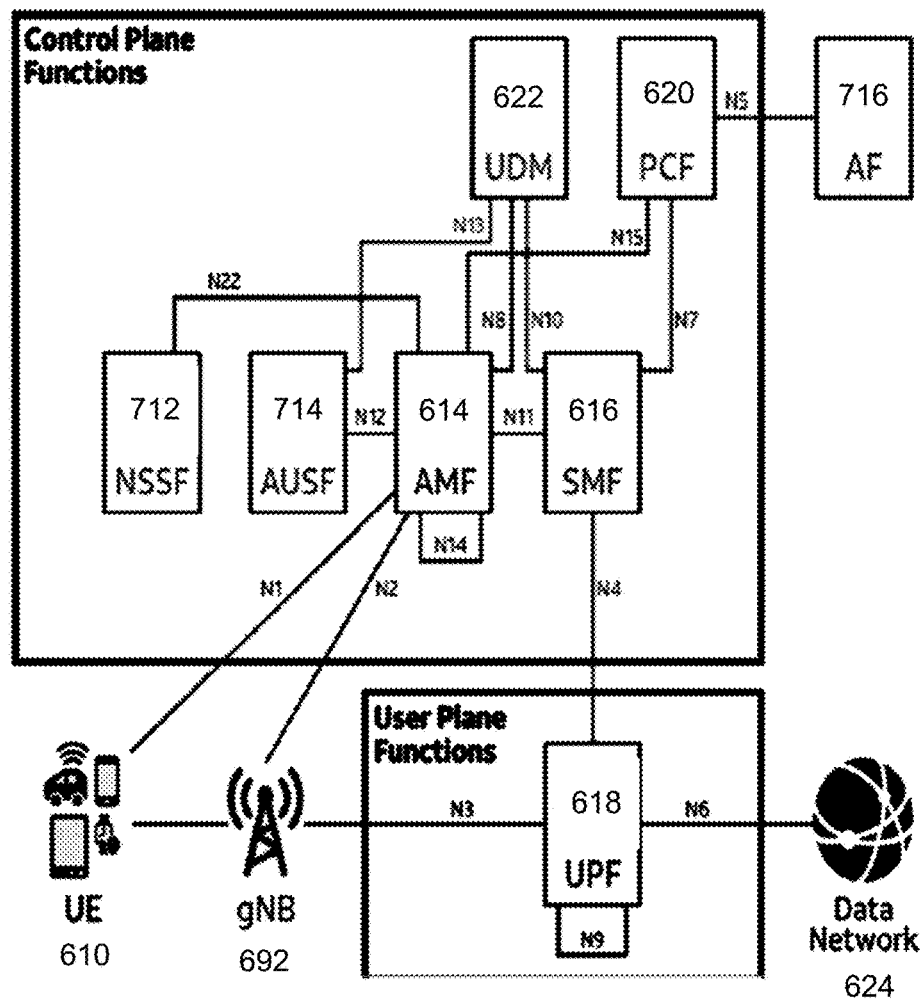
FIG. 7 depicts a non-limiting example architecture diagram of an example system that can facilitate using transient reflective surfaces reflect a signal to destination equipment, in accordance with one or more embodiments.
Figure 8:
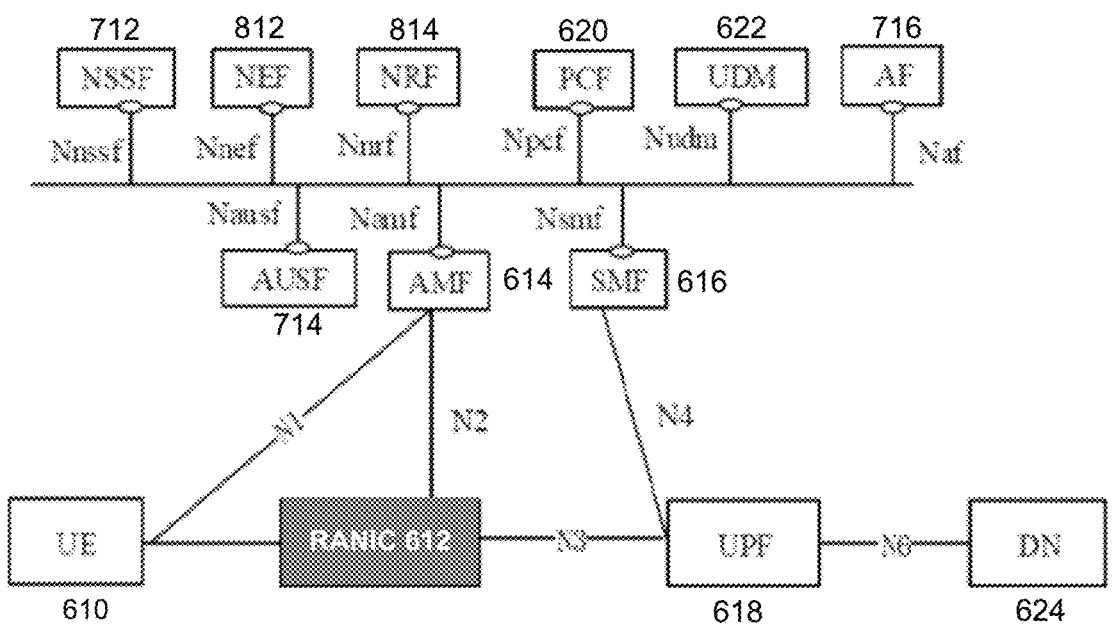
FIG. 8 illustrates an example method that can facilitate using a reflective surface to reflect a signal from access point equipment to signal receiving equipment, in accordance with one or more embodiments.

FIGS. 6, 7, and 8 respectively depict an example signal diagram 600, and architecture diagrams 700 and 800 that can facilitate predicting that a transient reflective surface is going to be usable by access point equipment to reflect a signal to destination equipment, in accordance with one or more embodiments. For purposes of brevity, description of like elements and/or processes employed in other embodiments is omitted. Signal diagram 600 illustrates a non-limiting example sequence of events that illustrates how existing 5G core virtual network functions (VNFs) and elements of the 5G RAN (e.g., gNBs) can be configured to facilitate handshaking for scanning expanded coverage areas enabled by reflective surfaces.

Illustrative components of signal diagram 600 include UE 610, radio access network intelligent controller (RANIC) 612, access management function (AMF) 614, session management function (SMF) 616, user plane function (UPF) 618, policy control function (PCF) 620, unified data management (UDM) 622, and data network (DN) 624. Non-limiting architecture diagram 700 of FIG. 7 includes some of the above noted components of FIG. 6, as well as network slice selection function (NSSF) 712, authentication server function (AUSF) 714, gNB 792, and application function (AF) 716. Non-limiting architecture diagram 800 of FIG. 8 includes some of the above noted components of FIGS. 6 and 7, as well as network exposure function (NEF) 812, and network repository function (NRF) 814.

At 642, a protocol data unit (PDU) session establishment request is communicated from UE 610 to SMF 616 via AN 612 and AMF 614. At 644, a get subscription data message is relayed from SMF 616 to UDM 622, via UPF 618 and PCF 620. At 646, a get policy rules message is communicated from SMF 616 to PCF 620, via UPF 618. At 648, SMF 616 establishes with UPF 618, a session for the user plane.

At 650, based on a priority for the communication to UE 610, SMF 616 can request radio resources from RANIC 612 via AMF 614, e.g., additional resources can be dedicated for RANIC 612 to locate useful reflective surfaces for the connection. In one or more embodiments, resources allocated to RANIC 612 can be adjusted based on different system requirements, e.g., additional resources can be allocated to increase the frequency with which discoveries of useful reflective surfaces occur. One having skill in the relevant art(s), given the description herein appreciates different types of applications that can require improved performance, e.g., applications with holographic communications, e-gaming, tele-health applications for live diagnostics, etc.

At 652, radio resources can be setup by communication between UE 610 and RANIC 612. At 654, RANIC 612 responds to the 650 request, e.g., an example response being a notification to core network resources regarding reflective surfaces are identified and can be potentially can be used during the call, even in a situation where UE 610 and/or reflective surface 250 are mobile. At 656, SMF 616 updates UPF 618 to setup a tunnel to RANIC 612. At 658, a user session can be established between UE 610 and UPF 618 via AN 612, AMF 614, SMF 616, and UPF 618.

In an example implementation, a user application can be installed on UE 610 to monitor the applications of UE 610 and, based on the workload and QoS and reliability requirements, the user application can notify a backend server to use UPF 618 to command RANIC 612 to dedicate additional system resources to finding reflective surfaces for better signal coverage. In a variation of this example, the user application can also monitor the communications of UE 610 for excessive packet loss or delay and can trigger the above noted resource allocations based on these conditions.

In one or more embodiments, preemptive activity can be performed to facilitate potentially required supplementation of communications signals by reflective signal bandwidth, e.g., utilizing a reachability management module of AMF 614 to track the position of UE 610 in relation to known and potentially useful reflective surfaces if UE 610 requires additional resources. Based on this tracking, AMF 614 can provide additional feedback to RANIC 612 regarding locations where resources available for the supplementation of surface repository 125 can be utilized. Further to this end, in one or more embodiments, a security context management module of AMF 614 can conserve RANIC 612 resources by authenticating the service level allocated to UE 610, e.g., whether UE 610 has a higher priority designation, such as for public safety customers.

Figure 9:
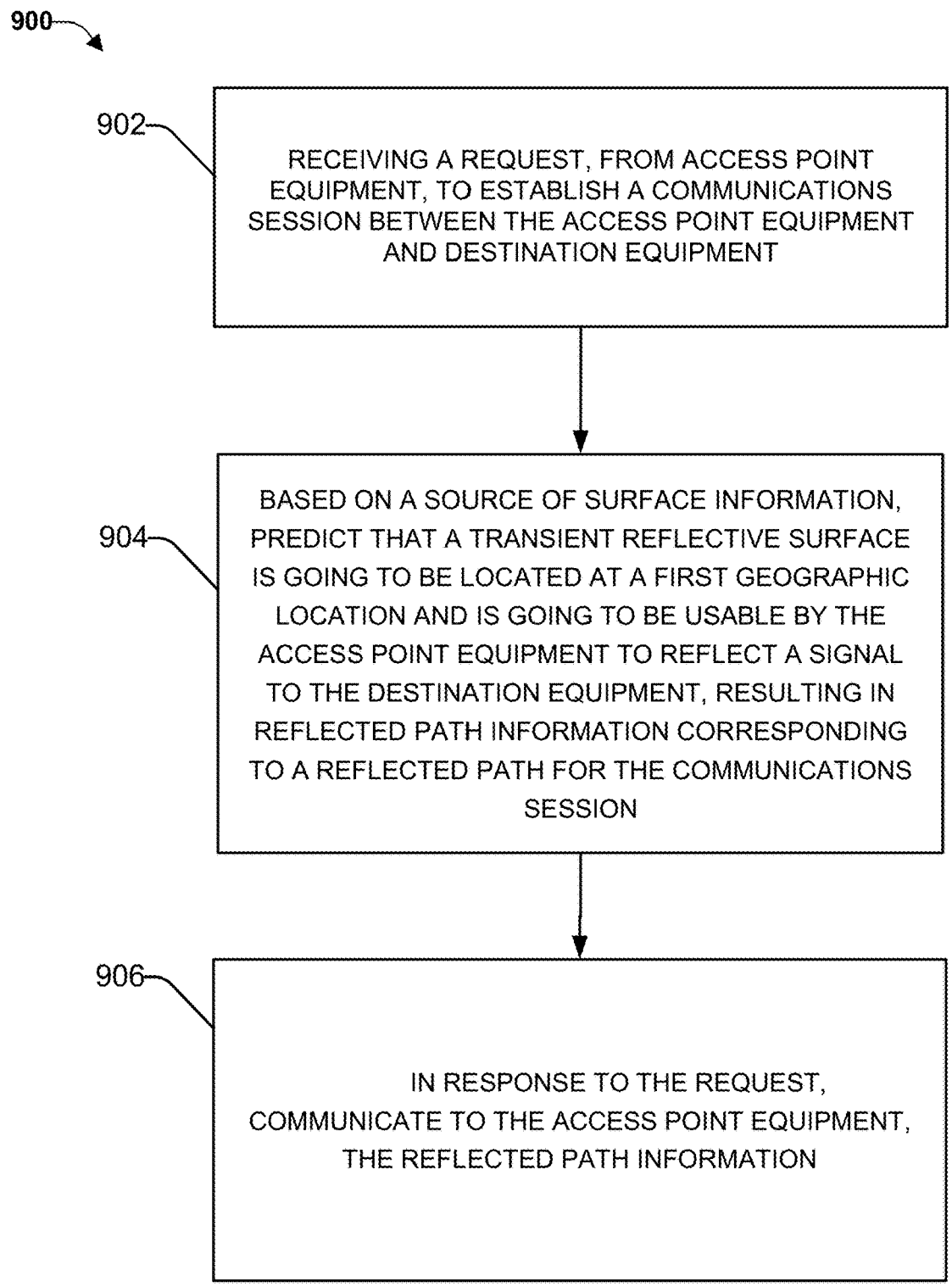
FIG. 9 illustrates an example method that can facilitate predicting that a transient reflective surface is going to be usable by access point equipment to reflect a signal to destination equipment, in accordance with one or more embodiments.

FIG. 9 illustrates an example method 900 that can facilitate predicting that a transient reflective surface is going to be usable by access point equipment to reflect a signal to destination equipment, in accordance with one or more embodiments. For purposes of brevity, description of like elements and/or processes employed in other embodiments is omitted.

At 902, method 900 can include receiving a request, from access point equipment, to establish a communications session between the access point equipment and destination equipment. At 904, method 900 can include based on a source of surface information, predicting that a transient reflective surface is going to be located at a first geographic location and is going to be usable by the access point equipment to reflect a signal to the destination equipment, resulting in reflected path information corresponding to a reflected path for the communications session. At 906, method 900 can include in response to the request, communicating to the access point equipment, the reflected path information.

Figure 10:
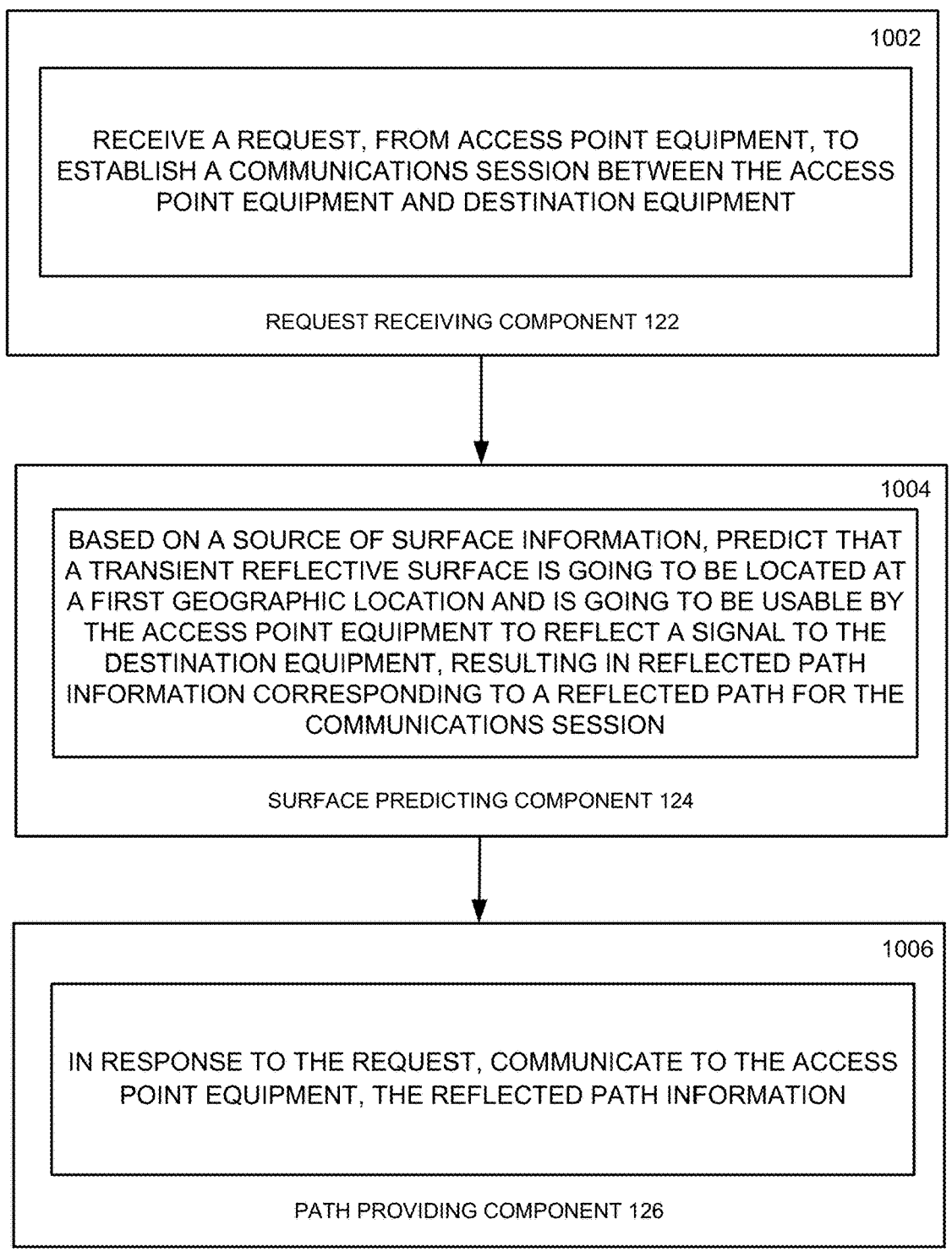
FIG. 10 depicts a system that can facilitate predicting that a transient reflective surface is going to be usable by access point equipment to reflect a signal to destination equipment, in accordance with one or more embodiments.

FIG. 10 depicts a system 1000 that can facilitate predicting that a transient reflective surface is going to be usable by access point equipment to reflect a signal to destination equipment, in accordance with one or more embodiments. For purposes of brevity, description of like elements and/or processes employed in other embodiments is omitted. As depicted, system 1000 can include request receiving component 122, surface predicting component 124, path providing component 126, and other components described or suggested by different embodiments described herein, that can improve the operation of system 1000.

In a non-limiting example, component 1002 can include the functions of request receiving component 122, supported by the other layers of system 1000. For example, component 1002 can receive a request, from access point equipment, to establish a communications session between the access point equipment and destination equipment. In this and other examples, component 1004 can include the functions of surface predicting component 124, supported by the other layers of system 1000. Continuing this example, in one or more embodiments, component 1004 can, based on a source of surface information, predict that a transient reflective surface is going to be located at a first geographic location and is going to be usable by the access point equipment to reflect a signal to the destination equipment, resulting in reflected path information corresponding to a reflected path for the communications session. Continuing this example, component 1006 can include the functions of path providing component 126, supported by the other layers of system 1000. For example, component 1006 can in response to the request, communicate to the access point equipment, the reflected path information.

Figure 11:
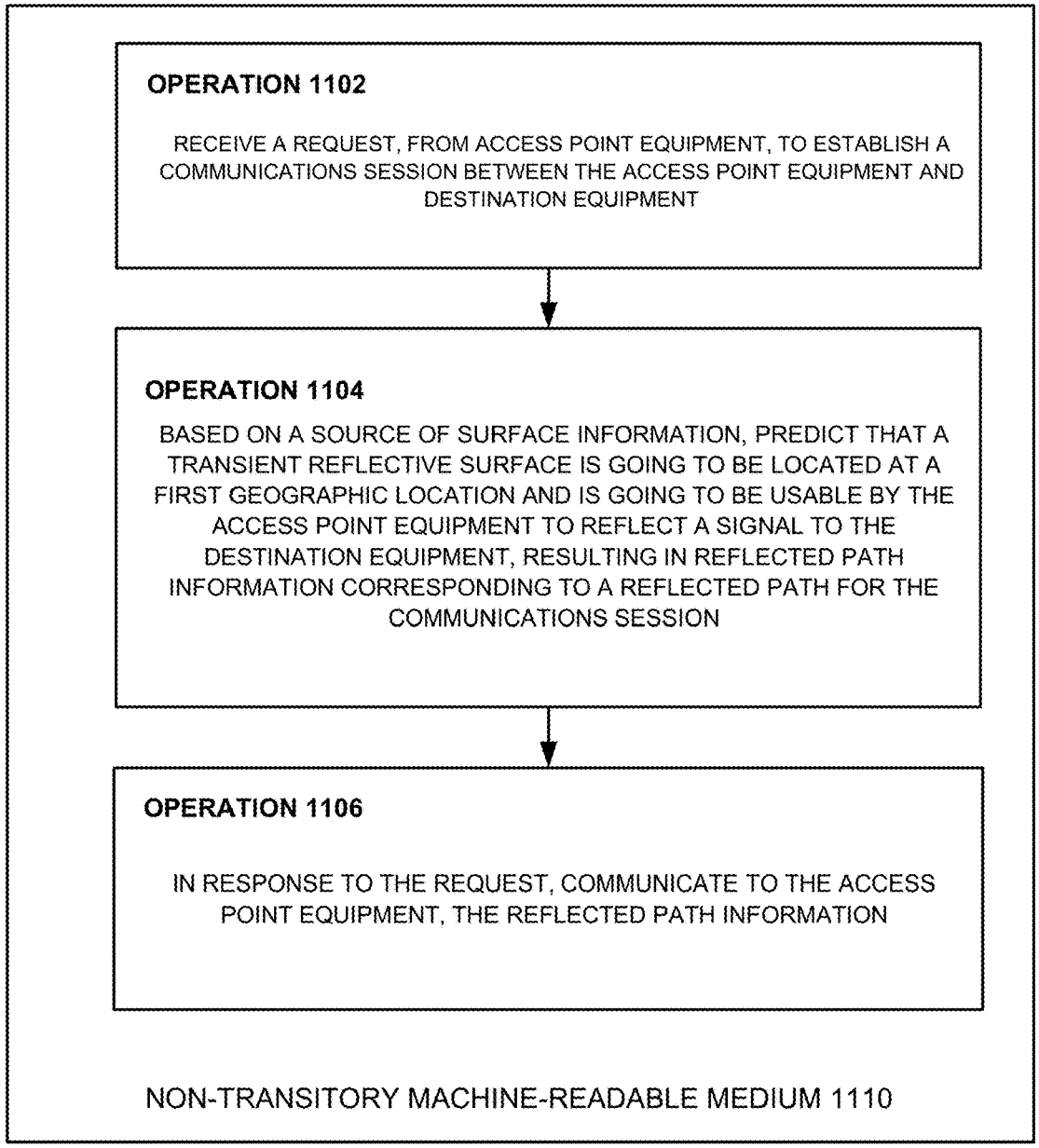
FIG. 11 depicts an example non-transitory machine-readable medium that can include executable instructions that, when executed by a processor of a system, facilitate predicting that a transient reflective surface is going to be usable by access point equipment to reflect a signal to destination equipment, in accordance with one or more embodiments described above.

FIG. 11 depicts an example 1100 non-transitory machine-readable medium 1110 that can include executable instructions that, when executed by a processor of a system, facilitate predicting that a transient reflective surface is going to be usable by access point equipment to reflect a signal to destination equipment, in accordance with one or more embodiments described above. For purposes of brevity, description of like elements and/or processes employed in other embodiments is omitted. As depicted, non-transitory machine-readable medium 1110 includes executable instructions that can facilitate performance of operations 1102-1106.

In one or more embodiments, the operations can include operation 1102 that can receive a request, from access point equipment, to establish a communications session between the access point equipment and destination equipment. Operations can further include operation 1104, that can, based on a source of surface information, predict that a transient reflective surface is going to be located at a first geographic location and is going to be usable by the access point equipment to reflect a signal to the destination equipment, resulting in reflected path information corresponding to a reflected path for the communications session. In one or more embodiments, the operations can further include operation 1106 that can, in one or more embodiments, in response to the request, communicate to the access point equipment, the reflected path information.

Figure 12:
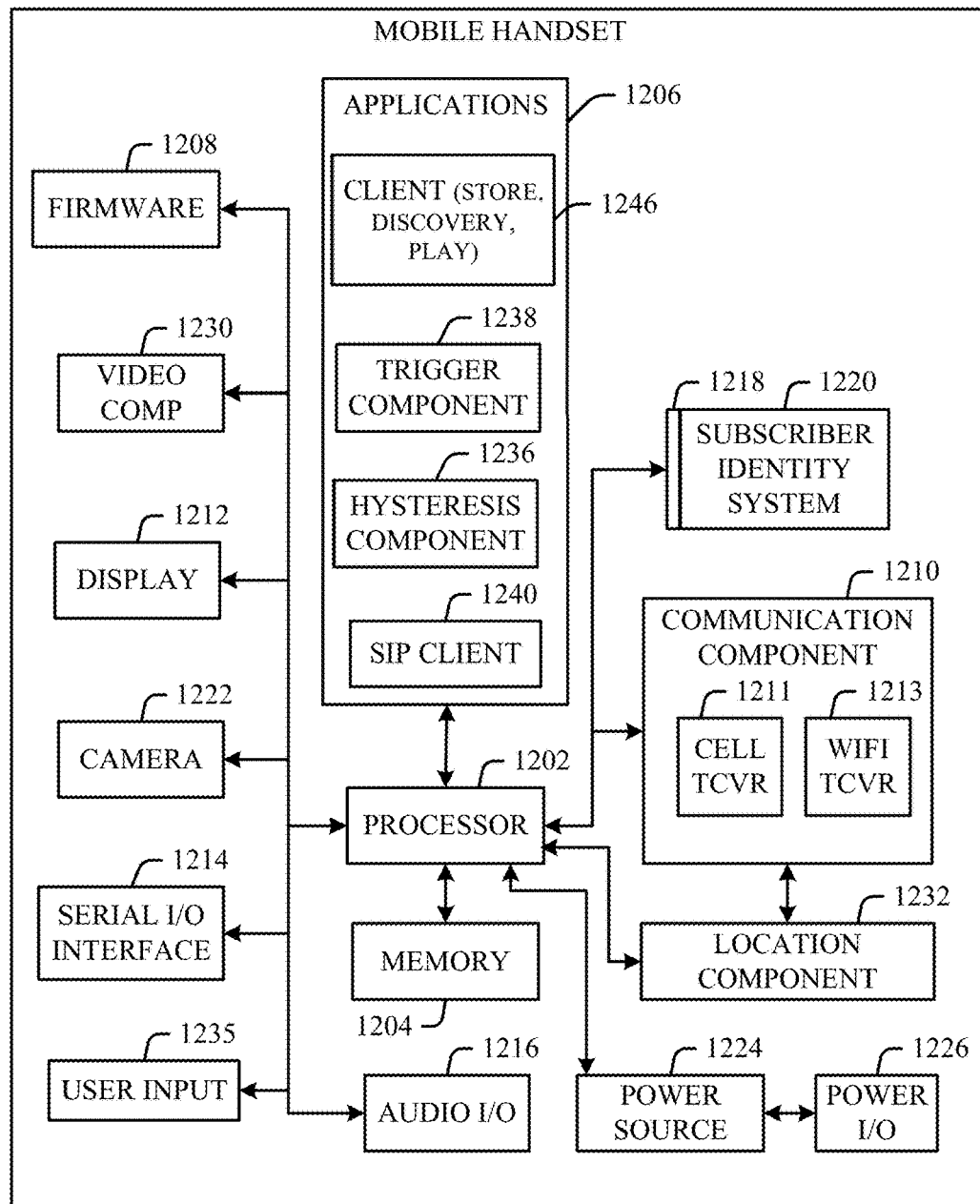
FIG. 12 illustrates an example block diagram of an example mobile handset operable to engage in a system architecture that can facilitate processes described herein, in accordance with one or more embodiments.

FIG. 12 illustrates an example block diagram of an example mobile handset 1200 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1294) through a hard-wire connection, and other serial input devices (e.g., a keyboard, keypad, and mouse). This supports updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card SIM or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or a decoded format.

A video processing component 1222 (e.g., a camera) can be provided for decoding encoded multimedia content. The video processing component 1222 can aid in facilitating the generation, editing, and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touch screen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G NR systems, one or more embodiments discussed herein can be applicable to any RAT or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 13:
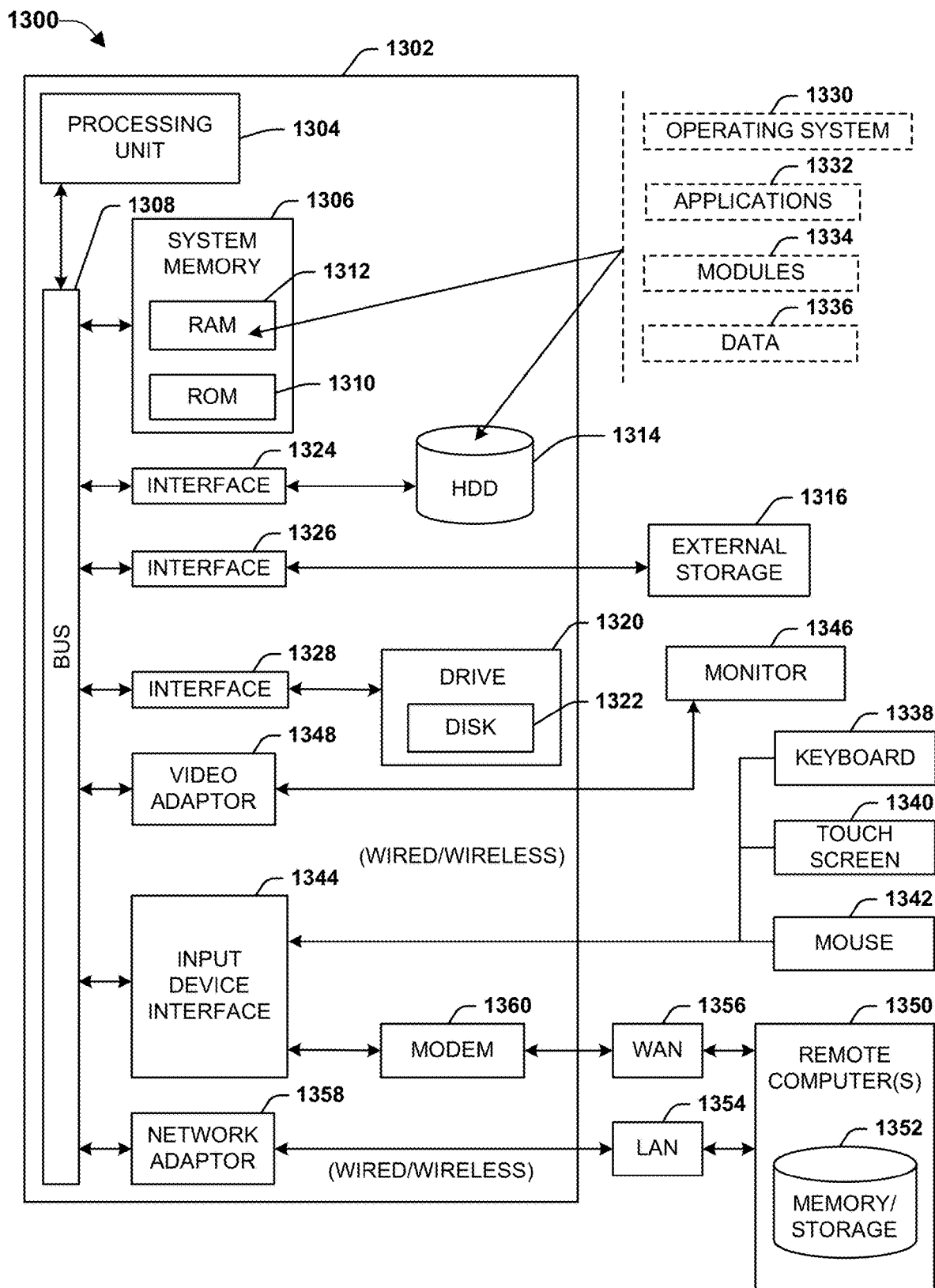
FIG. 13 illustrates an example block diagram of an example computer operable to engage in a system architecture that can facilitate processes described herein, in accordance with one or more embodiments.

FIG. 13 provides additional context for various embodiments described herein, intended to provide a brief, general description of a suitable operating environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example operating environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and a drive 1320, e.g., such as a solid-state drive, an optical disk drive, which can read or write from a disk 1322, such as a CD-ROM disc, a DVD, a BD, etc. Alternatively, where a solid-state drive is involved, disk 1322 would not be included, unless separate. While the internal HDD 1314 is illustrated as located within the computer 1302, the internal HDD 1314 can also be configured for external use in a suitable chassis (not shown). Additionally, while not shown in environment 1300, a solid-state drive (SSD) could be used in addition to, or in place of, an HDD 1314. The HDD 1314, external storage device(s) 1316 and drive 1320 can be connected to the system bus 1308 by an HDD interface 1324, an external storage interface 1326 and a drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above, such as but not limited to a network virtual machine providing one or more aspects of storage or processing of information. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
   receiving, by routing controller equipment comprising a processor, a request, from access point equipment, to establish a communications session between the access point equipment and destination equipment;
   based on a source of surface information, predicting, by the routing controller equipment, that a transient reflective surface is going to be located at a first geographic location and is going to be usable by the access point equipment to reflect a signal to the destination equipment, resulting in reflected path information corresponding to a reflected path for the communications session; and
   in response to the request, communicating, by the routing controller equipment, to the access point equipment, the reflected path information.

2. The method of claim 1, wherein the transient reflective surface is a surface of a vehicle.

3. The method of claim 2, wherein the first geographic location is comprised on a roadway, and wherein the source of surface information comprises a schedule indicating a traffic load on the roadway.

4. The method of claim 3, wherein the access point equipment comprises mobile access point equipment moving on the roadway, and wherein the source of surface information further comprises a source describing the transient reflective surface comprised on the vehicle moving on the roadway.

5. The method of claim 4, wherein the predicting that the transient reflective surface is going to be located at the first geographic location comprises analyzing velocities on the roadway of the mobile access point equipment and the vehicle.

6. The method of claim 2, wherein the first geographic location is comprised in a parking lot, and wherein the source of surface information comprises a schedule of events that affects a number of vehicles that are parked in the parking lot.

7. The method of claim 1, wherein the transient reflective surface is a surface of a precipitation-holding material where reflectivity is enhanced based on precipitation.

8. The method of claim 7, wherein the precipitation comprises rain adhered to the precipitation-holding material, and wherein the source of surface information comprises a precipitation forecast for the first geographic location.

9. The method of claim 1, further comprising, before receiving the request:
   receiving, by the routing controller equipment, reflective surface information from reflective surface collector equipment, and
   storing, by the routing controller equipment, the reflective surface information in the source of surface information.

10. The method of claim 9, wherein the reflective surface collector equipment collected the reflective surface information based on a light sensor receiving sunlight reflected off the transient reflective surface.

11. The method of claim 9, wherein the reflective surface collector equipment collected the reflective surface information based on a probing signal transmitted by the reflective surface collector equipment.

12. The method of claim 1, wherein the predicting that the transient reflective surface is going to be usable by the access point equipment comprises selecting transient reflective surfaces determined not to be part of aircraft in flight.

13. The method of claim 12, wherein selecting the transient reflective surfaces determined not to be part of the aircraft in flight is based on detecting a sound generated by the aircraft.

14. Routing controller equipment, comprising:
    a processor; and
    a memory that stores executable instructions that, when executed by the processor, facilitate performance of operations, comprising:
    receiving a request, from access point equipment, to establish a communications session between the access point equipment and destination equipment;
    based on a source of surface information, predicting that a transient reflective surface is going to be located at a first geographic location and is going to be usable by the access point equipment to reflect a signal to the destination equipment, resulting in reflected path information corresponding to a reflected path for the communications session; and
    in response to the request, communicating to the access point equipment, the reflected path information.

15. The routing controller equipment of claim 14, wherein the transient reflective surface is a surface of a vehicle, and the first geographic location is comprised on a roadway, and wherein the source of surface information comprises a schedule indicating a traffic load on the roadway.

16. The routing controller equipment of claim 15, wherein the access point equipment comprises mobile access point equipment moving on the roadway, and wherein the source of surface information further comprises a source describing the transient reflective surface comprised on the vehicle moving on the roadway.

17. The routing controller equipment of claim 14, further comprising, before receiving the request:
    receiving, by the routing controller equipment, reflective surface information from reflective surface collector equipment, and
    storing, by the routing controller equipment, the reflective surface information in the source of surface information.

18. A non-transitory machine-readable medium, comprising executable instructions that, when executed by a processor of controller equipment, facilitate performance of operations, comprising:
- receiving a request from access point equipment to establish a communications session between the access point equipment and a mobile device;
- based on a source of surface information, predicting that a transient reflective surface is going to be located at a first geographic location and is going to be usable by the access point equipment to reflect a signal to the mobile device, resulting in reflected path information corresponding to a reflected path for the communications session; and
- in response to the request, communicating, to the access point equipment, the reflected path information.

19. The non-transitory machine-readable medium of claim 18, wherein the transient reflective surface is a surface of a precipitation-holding material where reflectivity is enhanced based on precipitation.

20. The non-transitory machine-readable medium of claim 19, wherein the precipitation comprises rain adhered to the precipitation-holding material, and wherein the source of surface information comprises a precipitation forecast for the first geographic location.

* * * * *